(12) United States Patent
Schüring

(10) Patent No.: US 6,312,298 B1
(45) Date of Patent: Nov. 6, 2001

(54) ELECTROMOTIVE DRIVE SYSTEM FOR A SHIP

(75) Inventor: Ingo Schüring, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/463,261

(22) Filed: Apr. 19, 2000

(30) Foreign Application Priority Data

| Jul. 21, 1997 | (DE) | 197 31 816 |
| Jun. 5, 1998 | (DE) | 198 26 229 |

(51) Int. Cl.7 ............................................... B60L 11/00
(52) U.S. Cl. ..................................................... 440/6
(58) Field of Search ..................................... 440/6

(56) References Cited

U.S. PATENT DOCUMENTS

| 2,714,866 | 8/1955 | Pleuger et al. . |
| 2,862,122 | 11/1958 | Courtin et al. . |
| 3,703,642 | * 11/1972 | Balaguer ................................. 440/6 |
| 3,801,843 | * 4/1974 | Corman et al. ....................... 310/52 |
| 5,101,128 | 3/1992 | Veronesi et al. . |
| 5,365,132 | * 11/1994 | Hann et al. ............................ 310/58 |
| 5,403,216 | 4/1995 | Salmi et al. . |

FOREIGN PATENT DOCUMENTS

| 683970 | 11/1939 | (DE) . |
| 1 638 276 | 7/1971 | (DE) . |
| 0 493 704 | 7/1992 | (EP) . |
| 739896 | 11/1955 | (GB) . |
| 2 260 805 | 4/1993 | (GB) . |
| WO 97/09771 | 3/1997 | (WO) . |
| WO 97/49605 | 12/1997 | (WO) . |
| WO-99/05023-A1 | * 2/1999 | (WO) . |

OTHER PUBLICATIONS

Peter Andersen et al., "New Type of Permanent Field Machines for diesel electric propulsion systems", Siemens–Schottel–Propulsor (SSP) The Podded Electric Drive with Permanently Excited Motor, Mar. 7, 1997.

* cited by examiner

Primary Examiner—Sherman Basinger
(74) Attorney, Agent, or Firm—Kenyon & Kenyon

(57) ABSTRACT

In an electromotive drive system in an improved form of a propeller motor for a ship, the cooling of the motor in a simple manner is provided. For re-cooling a circulating coolant, an annular duct is provided, which is arranged inside a shaft-like supporting part on its wall. With the assistance of this supporting part, the propeller motor is arranged, gondola-like, on the lower side of the ship.

4 Claims, 2 Drawing Sheets

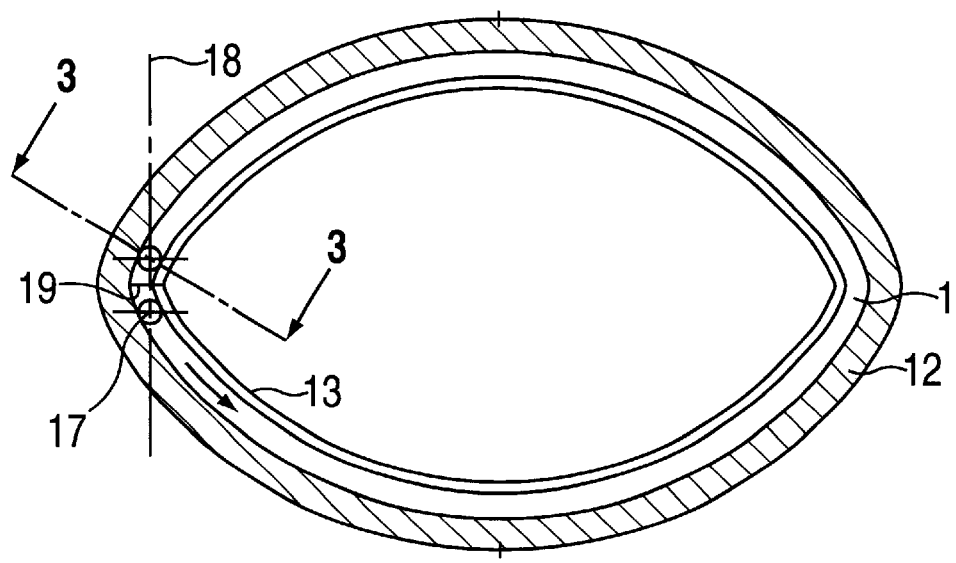
FIG. 2
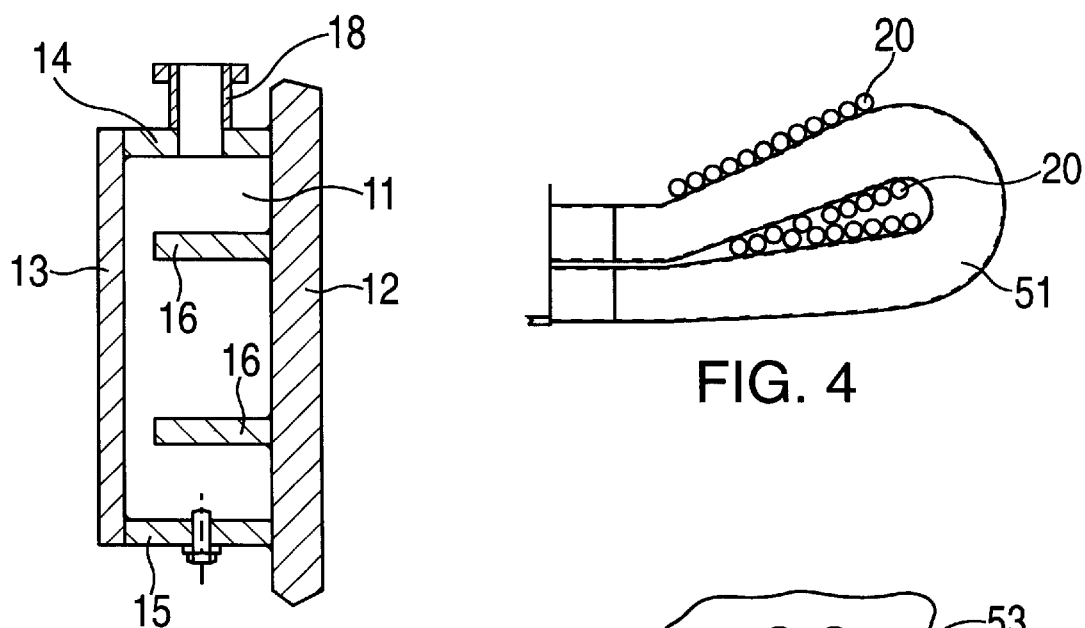
FIG. 3
FIG. 4
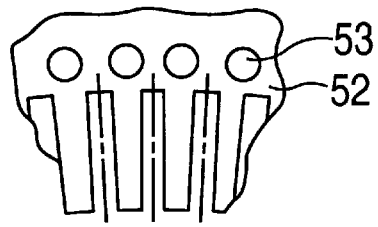
FIG. 5

ELECTROMOTIVE DRIVE SYSTEM FOR A SHIP

FIELD OF THE INVENTION

The present invention relates to ship propulsion systems and can be used in the structural configuration of an electromotive drive system. The electromotive drive system includes an electric motor, composed of stator and motor which directly drives at least one propeller. The electric motor is arranged, gondola-like, using a shaft-like supporting structure on the lower side of a ship hull and in a housing having a streamlined shape, parts of the electric motor being artificially cooled.

BACKGROUND INFORMATION

In a conventional ship propulsion system, a three-phase AC current motor having a short-circuited rotor is used as the motor, the rotor being mounted on a hollow shaft, which is coupled via a coupling to the drive shaft running inside the hollow shaft. The drive shaft is directly coupled to the propeller. In this ship propulsion system, the stator of the motor is fit into a tubular frame, which in turn is inserted into a pipe-saddle-like housing part of the housing, secured, gondola-like, on the lower side of the ship hull by a shaft-like supporting part. The cooling of the motor, including the bearings of the rotor, is carried out using fresh water, which is pumped from a tank arranged in the ship hull into the interior of the gondola-like housing and is circulated. Such a conventional system is described in, for example, U.S. Pat. No. 2,714,866.

In another conventional ship propulsion system, which can be designed for propulsive outputs of 10 MW and more, the dynamoelectric motor having its stator is supported in the surrounding housing by radially arranged web plates. The web plates used for this purpose also function to form cooling ducts (pipes) for a gaseous coolant, supplied from the ship hull and re-cooled there using a heat exchanger. In this context, the costly cooling device is arranged on the shaft-like supporting part. Conventionally, a synchronous motor, which is supplied by a frequency converter and which has a separately excited rotor, is used as the motor, the rotor being able to be additionally cooled through being arranged on a hollow drive shaft that has water flowing through it. Such an arrangement is described in, for example, U.S. Pat. No. 5,403,216.

For the purpose of cooling an electric motor that is driven under water, it is also conventional to pump in circulation the insulating oil used as a coolant so that in the cooling ducts which run axially in the area of the housing wall, heat is dissipated into the ambient water. Such a conventional system is described in, for example, U.S. Pat. No. 2,862,122.

It is furthermore conventional for the coolant circulation of a driving engine (prime mover) of a ship arranged in the ship hull to use a heat exchanger that is integrated into the jacket ring of the propeller. Such circulation is described in, for example, British Patent No. 2 260 805.

SUMMARY

An object of the present invention is to simplify the arrangement and configuration of the cooler.

According to the present invention, the cooler is includes an annular duct that is arranged below the ship and inside the shaft-like supporting part on its wall, the duct being provided with openings for the intake and outflow of the coolant.

Thus, the present invention provides for using the wall of the shaft-like supporting part itself as a part of the cooler, and specifically as a heat-exchanging element for re-cooling the coolant using the ambient seawater. For optimizing the cooling performance, provision may be made for additional cooling fins, which extend into the annular duct and are joined to the wall of the supporting part.

An arrangement and configuration of the cooler of this type saves space and weight and avoids a flexible coupling between various parts of the cooling device, which are assigned, on the one hand, to the rotatable part of the drive system and, on the other hand, to the body of the ship.

The configuration and arrangement of the cooler provided according to the present invention are particularly suited for ship propulsion systems as described in WO97/49605 dated Jun. 24, 1997, (which is based on German Patent Application No. 196 27 323.4), which are distinguished by the fact that the electric motor is furnished with a permanently magnetized and therefore low-loss rotor, that the stator is configured in a form-locking manner in the streamlined housing, and that the interior space of the housing containing the electric motor is free from a flowing coolant. This configuration of the electric motor, in conditions of appropriate use, makes possible direct cooling solely using the ambient seawater. Waste heat that can arise in response to more intensive use as a function of the design of the electric motor in the coil ends, stator irons, and/or in the winding copper in the area of the core stack of the stator and that cannot be dissipated directly through the housing into the ambient seawater must be removed with the assistance of an additional cooler. The dissipation of this waste heat can advantageously be carried out using a cooler configured according to the present invention, by having cooling pipes lead from the annular cooling duct to the coil ends of the stator and, if appropriate, also to axial cooling ducts that are arranged so as to be equally distributed in the peripheral direction.

An exemplary embodiment of an electromotive drive system having a cooler configured according to the present invention is depicted in FIGS. 1 through 5.

BRIEF DESCRIPTION OF THE DRAWINGS

FIGS. 2 and 3 show the annular duct of the cooler in a top view and cross section, respectively.

FIG. 4 shows the coordination of cooling pipes with respect to the coil ends.

FIG. 5 shows the arrangement of cooling ducts in the core stack of the stator.

DETAILED DESCRIPTION

Figure 1:
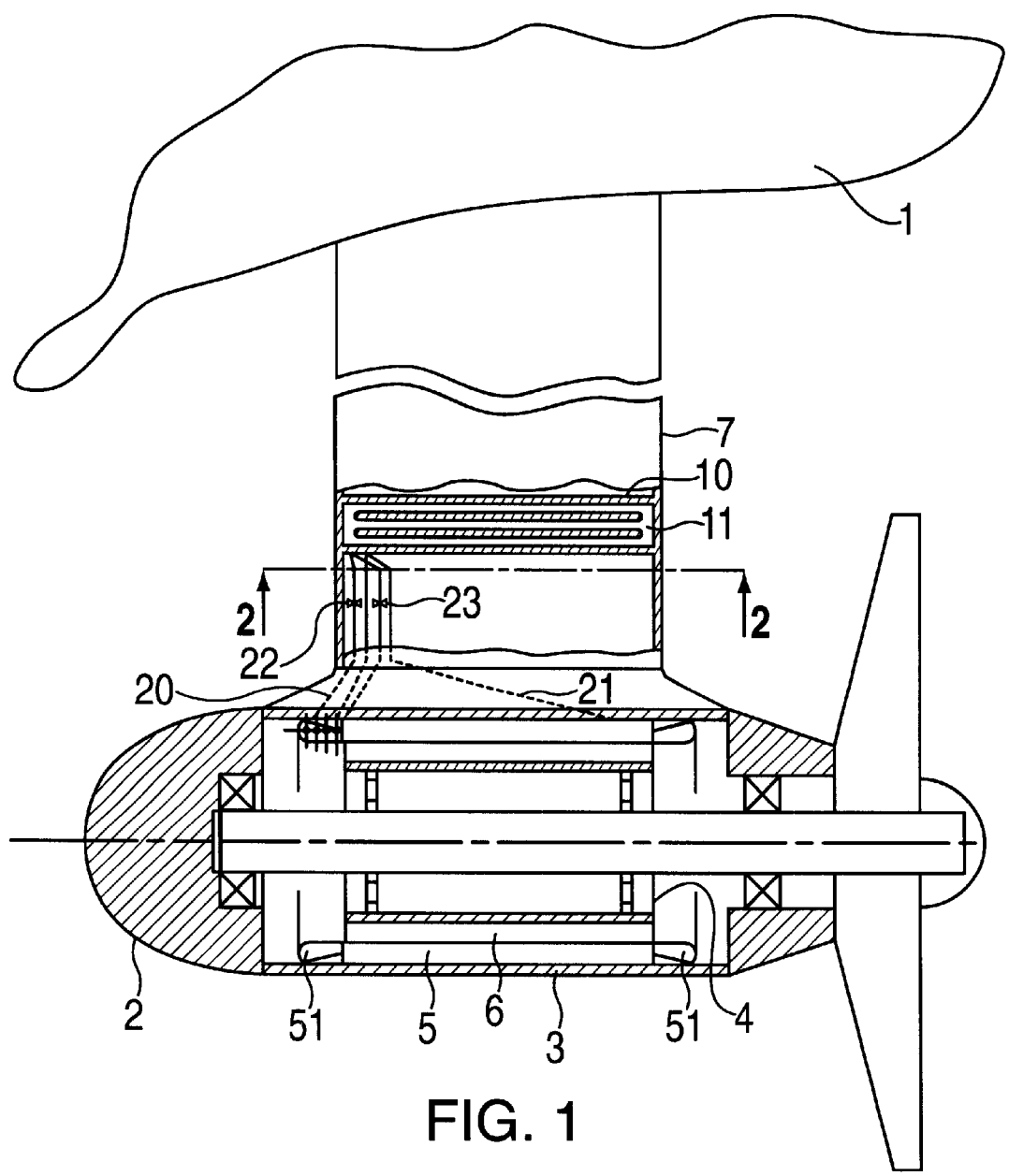
FIG. 1 shows in a schematic representation the coordination of the cooler with respect to the drive system according to the present invention.

FIG. 1 shows one part of a ship hull 1, in whose rear (stern) area an electromotive drive device is arranged. For this purpose, an electric motor 4 includes a stator 5 and a permanently magnetized rotor 6 is located in a streamlined housing 2, the stator fitting into tubular housing part 3. Housing 2 having electric motor 4 is secured on or in ship hull 1 by a shaft-like supporting part 7.

Inside shaft-like supporting part 7 and above housing 2, a cooler 10 is arranged which in accordance with FIGS. 2 and 3, includes an annular duct 11, which is arranged on the interior side of wall 12 of supporting part 7. The cooling duct, rectangular in cross section is formed, on the one hand, by wall 12 of supporting part 7, by an upper and lower transverse wall 14 and 15, and by an inner wall 13. Extending into this annular duct are also cooling fins 16, which emerge from wall 12. The cooling duct 11, running in the peripheral direction of supporting part 7, is interrupted at one location by a separating wall 19, and on both sides of the separating wall, an intake opening 17 and an outlet opening 18 are arranged for a liquid coolant.

According to FIG. 1, cooling pipes 20 proceed from intake opening 17 and outlet opening 18 to coil ends 51 of stator 5, and cooling pipes 21 from coil stack 52 of stator 5. According to FIG. 4, cooling pipes 20 are arranged on the exterior side and in the interior of coil ends 51. According to FIG. 5, provision is made in stator coil stack 52 for cooling ducts 53, arranged so as to be equally separated in the peripheral direction, to which cooling pipes 21 can be connected.

For circulating the coolant a pump 22 or 23, respectively, is provided.

What is claimed is:

1. An electromotive drive system for a ship, comprising:

an electric motor including a stator and a rotor, the motor being arranged gondola-like in a streamlined housing on a shaft-like support part on a lower side of the ship, the support part having a tubular wall, the tubular wall of the support part having a circumference; and a cooler re-cooling circulating coolant for cooling parts of the motor, the cooler including a ring-like duct arranged below a hull of the ship and along the tubular wall of the support part, the coolant circulating within the ring-like duct in a direction of the circumference of the tubular wall of the support part, the ring-like duct having openings for an intake and outlet of coolant.

2. The drive system according to claim 1, further comprising:

cooling fins extending into the ring-like duct, the cooling fins being connected to the wall of the support part.

3. The drive system according to claim 1, wherein the rotor is a permanently magnetized rotor and the stator of the electric motor is fit in a form-locking manner into the stream-lined housing, further comprising:

cooling pipes for cooling coil ends of the stator and connected to the ring-like duct of the cooler.

4. The drive system according to claim 3, further comprising:

further cooling pipes connected to the ring-like duct of the cooler, the cooling pipes being connected to axial bore holes of the stator, the bore holes arranged to be equally distributed in a peripheral direction.

* * * * *